United States Patent
Steffl (10) Patent No.: US 9,157,731 B2
(45) Date of Patent: Oct. 13, 2015

(54) APPARATUS AND METHOD FOR DETERMINING THE SPATIAL POSITION AND VELOCITY VECTOR OF A SPHERICAL PROJECTILE

(71) Applicant: Leo Thomas Steffl, Plymouth, MN (US)

(72) Inventor: Leo Thomas Steffl, Plymouth, MN (US)

( * ) Notice: Subject to any disclaimer, the term of this patent is extended or adjusted under 35 U.S.C. 154(b) by 99 days.

(21) Appl. No.: 13/664,148

(22) Filed: Oct. 30, 2012

(65) Prior Publication Data

US 2014/0118720 A1    May 1, 2014

(51) Int. Cl.
| | |
|---|---|
| *G01P 3/36* | (2006.01) |
| *G01B 11/14* | (2006.01) |
| *G01P 3/68* | (2006.01) |
| *G01B 11/00* | (2006.01) |

(52) U.S. Cl.
CPC ............... *G01B 11/14* (2013.01); *G01P 3/685* (2013.01); *G01B 11/002* (2013.01)

(58) Field of Classification Search
CPC .......... G01S 17/58; G01S 17/50; G01P 5/26; G01P 3/36; G01P 3/68; G01P 3/366; G01B 11/14; G01B 11/002
USPC .................... 356/28, 28.5, 614, 615
See application file for complete search history.

(56) References Cited

U.S. PATENT DOCUMENTS

| | | | | |
|---|---|---|---|---|
| 3,727,069 | A * | 4/1973 | Crittenden et al. | 250/222.1 |
| 3,814,438 | A * | 6/1974 | Baron et al. | 473/192 |
| 4,272,189 | A * | 6/1981 | Bailey et al. | 356/28 |
| 4,763,903 | A * | 8/1988 | Goodwin et al. | 273/371 |
| 4,770,527 | A * | 9/1988 | Park | 356/28 |
| 4,778,177 | A * | 10/1988 | Taksony | 473/451 |
| 4,949,972 | A * | 8/1990 | Goodwin et al. | 273/371 |
| 5,333,855 | A * | 8/1994 | Silin et al. | 473/455 |
| 5,479,008 | A * | 12/1995 | Nishiyama et al. | 250/222.1 |
| 5,626,526 | A * | 5/1997 | Pao et al. | 473/156 |
| 5,631,558 | A * | 5/1997 | Yoshida et al. | 324/178 |
| 6,985,206 | B2 * | 1/2006 | Anderson et al. | 352/28 |
| 7,295,329 | B2 * | 11/2007 | Gruhlke et al. | 356/614 |
| 7,367,906 | B2 * | 5/2008 | Tien | 473/451 |
| 7,399,241 | B1 * | 7/2008 | Thomas, Sr. | 473/455 |
| 7,861,699 | B2 * | 1/2011 | Gowan et al. | 124/32 |
| 7,944,549 | B2 * | 5/2011 | Oron et al. | 356/28 |
| 2004/0266562 | A1 * | 12/2004 | Gowan et al. | 473/416 |
| 2007/0026975 | A1 * | 2/2007 | Marty et al. | 473/467 |
| 2009/0122298 | A1 * | 5/2009 | Oron et al. | 356/28 |
| 2010/0292033 | A1 * | 11/2010 | Sarver | 473/431 |
| 2011/0073091 | A1 * | 3/2011 | Gowan et al. | 124/26 |

OTHER PUBLICATIONS

Gyula Hermann, 'Geometric Error Correction in Coordinate Measurement' vol. 4, No. 1, 2007.*

* cited by examiner

*Primary Examiner* — Luke Ratcliffe
*Assistant Examiner* — Assres H Woldemaryam (57) ABSTRACT

A spherical object is detected as it passes through an array of planer light beams and associated detectors. The construction of the apparatus is such that at least 4 planar light beams are obscured by the passing object, two parallel beams in one direction and two parallel beams in a second direction. The apparatus records the time at which each affected light beam is obstructed by the passing object. The apparatus then calculates the spatial position, velocity and trajectory of the object.

4 Claims, 7 Drawing Sheets

APPARATUS AND METHOD FOR DETERMINING THE SPATIAL POSITION AND VELOCITY VECTOR OF A SPHERICAL PROJECTILE

BACKGROUND OF THE INVENTION

This invention relates generally to devices for measuring the trajectory or flight path of a projectile. More specifically, it relates to systems using an array of light beams to determine the position, velocity and trajectory of a sphere or ball, such as a baseball as it passes through the Strike Zone.

Devices for determining the velocity and position of a ball are numerous in the art. These devices are typically used in sports training or sports games including especially baseball and golf. In the game of golf, such devices are often used to determine the flight path of the ball. In the game of baseball, such devices are frequently used to determine ball location or ball speed at the Strike Zone.

The inventions in the art can be grouped into several different categories depending on the technologies used. One method prevalent in the art uses radar systems. Another common method is the use of cameras and associated image processing. Ultrasonic sensors are also used, as are mechanically activated switches.

Another common method in the art, related to the current invention, utilizes light beams or laser beams and light detectors organized in an array. U.S. Pat. No. 4,949,972 uses a light array of crossing light beams to indicate the location of a projectile passing through the array. U.S. Pat. No. 7,944,549 uses an optical screen formed by a single light source and an array of detectors which receive the reflected light from the object in motion. U.S. Pat. No. 7,367,906 uses two light beam arrays. A first array detects horizontal position, a second array located a known distance from the first detects vertical position, and the know distance between arrays is used to calculate the velocity of the ball. U.S. Pat. No. 7,295,329 uses two light sources and light detectors to determine location of a moving object. U.S. Pat. No. 5,333,855 uses a light beam array with alternating emitters and detectors and calculates the length of time it takes for the ball to travel through the array as the basis for ball velocity. Ball position is determined by the location of obscured detectors. U.S. Pat. No. 6,985,206 uses two or more light curtains (potentially at the front and back of the strike zone) and measures the time it takes the ball to travel between light curtains to determine the velocity of the ball. U.S. Pat. No. 5,479,008 uses parallel light beams to calculate an instantaneous spatial position of a sphere in order to calculate a horizontal launch angle of a golf ball. This patent calculates the height dimension of the sphere based on information obtained from the light screen. U.S. Pat. No. 5,631,558 measures velocity using 2 parallel planes at a set distance apart; additionally, 2 groups of sensors arranged in an arc. The velocity of the sphere is not determined directly from the light screen but is calculated from the time it takes to traverse from a first group of sensors to a second group of sensors.

The drive for improvements in the art is due largely to the need for precision and accuracy at low cost. Cost is an important consideration since it is possible to obtain an accurate trajectory of a projectile using carefully located high speed cameras and associated image processing. However, this approach is prohibitively expensive for many applications.

The inventions, related to the current technology, available in the art, measure components of position (x, y and z components) and/or components of velocity (velocity in the x, y and z directions). In many circumstances, it is the velocity components perpendicular to the principle axis of flight (the x and y directions) that are most important. For example, the effectiveness of a breaking ball in baseball is largely based on the velocity of the ball in the directions perpendicular to the principle line of flight. It is here that the current inventions in the art fall short. None of the methods in the art accurately calculate the velocity without assuming a straight flight path (i.e. x and y components are assumed to be zero). This limits the usefulness of the information. For example, since the effectiveness of a baseball pitch (such as a breaking ball) is almost entirely based on the non-linear characteristics of the flight path, the assumption of a linear trajectory results in information that is of little value for analyzing curve ball effectiveness. The current invention provides nonlinear position, trajectory and velocity information with accuracy which is not available in the current state of the art for a simple, low cost apparatus.

Therefore, it is a primary objective of the current invention to provide more complete information on position and velocity than is currently provided; an improved measuring apparatus that precisely defines both the spatial position of the ball at the Strike Zone and additionally, the velocity vector (velocity and trajectory) of the ball at the Strike Zone while at the same time eliminating the assumption of a straight line trajectory.

It is a further objective of the present invention to provide a method for determining position and velocity that is more accurate than current methods. An accurate calculation of trajectory is required to make an accurate determination of Strike or Ball. Accuracy is also important to coaches and trainers as well as applications beyond sports.

It is still a further objective of the present invention to provide a method of determining position and velocity that is simple and low cost.

BRIEF SUMMARY OF THE INVENTION

Figure 1:
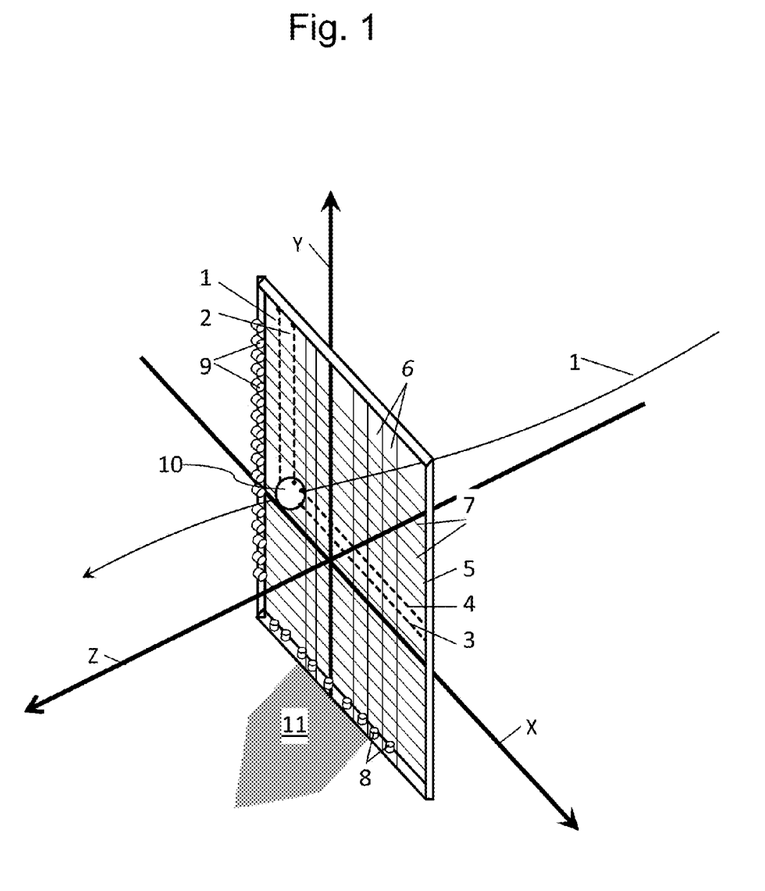
FIG. 1 is a schematic diagram of the projecting and receiving means of a preferred embodiment of the apparatus.

The current invention uses a plane of parallel light beams and light detectors, hereafter referred to as a Light Beam Array (or LBA). FIG. 1 shows an apparatus containing 2 LBAs which both lie in the same plane (both LBAs are located in the same plane for ease of discussion). As the ball moves into the LBAs, the ball obscures certain of the light beams. The light detectors, instrumentation, and computer record the times at which each beam is obscured by the ball relative to each of the obscured beams for each particular LBA. The light beams are appropriately spaced so that at least 2 adjacent detectors are obscured by the ball. By knowing the diameter of the ball, the spacing between the light beams and the times of obscuration relative to each other; the a) velocity of the ball, b) center of ball and c) trajectory of the ball, can all be found by solving a system of simultaneous equations. Additionally, this information is found without the assumption of a linear trajectory or knowledge of the launch point of the sphere.

The method used by this invention is unique in the art. The only data required to calculate the position and velocity are the beginning and ending of each beam obscuration relative to each obscured beam and the inherent properties of the sphere (diameter) and the LBA (beam spacing). No additional information is required. The launch point of the sphere is not part of the calculation nor are any other conditions of flight before or after the LBA such as the assumption of a straight line trajectory. By repeating this same methodology for 2 obscured light beams orthogonal (orthogonality is not required, but will be assumed for ease of discussion) to the first 2 light beams, the same information is found for a second plane. By combining these results, the total velocity vector (x, y and z components) and the location of the center of the ball (x, and y spatial position on the LBA plane) are determined at the plane of the LBA(s).

The device meets the objectives of providing more complete information, improving the accuracy of position, velocity and trajectory; the device is simple, uses readily available components and is inexpensive to construct.

DETAIL DESCRIPTION OF THE INVENTION

FIG. 1 shows a view of a spherical object 10 as it moves on a trajectory 1 toward a point of interest, in this case Home Plate 11. At the front edge of Home Plate, are located two Light Beam Arrays 5. Each Light Beam Array, hereafter referred to as an LBA, contains a beam projecting means (which emits a plurality of parallel beams of light) and a beam receiving means (which detects the obstruction of the beams of light).

FIG. 1 projecting means 6 is detected by receiving means 8 within the first LBA and projecting means 7 is detected by receiving means 9 within the second LBA.

The beam projecting means contains semiconductor emitters, such as laser diodes, as the light sources which emit a plurality of light beams sufficient in power to be detected by the semiconductor receivers. The beam receiving means comprises semiconductor receivers, such as photo diodes. The ray projecting means and receiving means are spaced, so that a minimum of two beams are obscured by the sphere in each LBA 1, 2, 3, 4. All beam projecting elements 6, 7 and beam receiving elements 8, 9 of the LBAs can be contained on a single plane, although this is not a requirement. The distance between beams must be known, but does not have to be constant as long as it remains less than the radius of the sphere.

Figure 2:
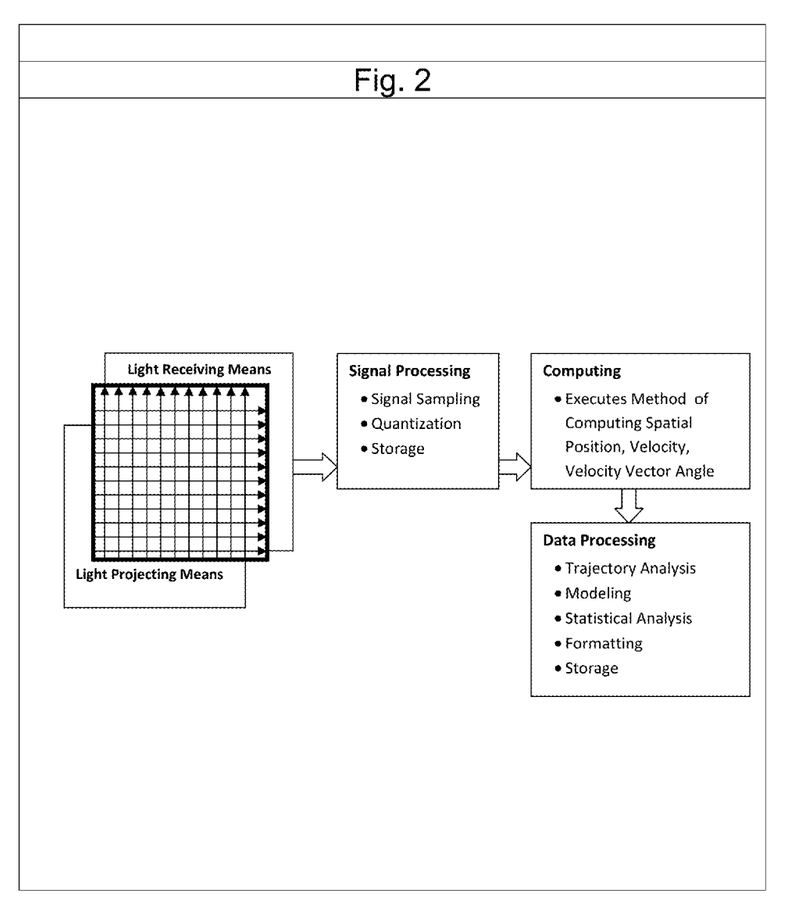
FIG. 2 depicts the major functional elements of a particular embodiment of the apparatus.

FIG. 2 shows the major elements of the apparatus for a particular embodiment. The instrumentation means measures the time and the voltage of each receiver element at a high sample rate. These signals are then stored by the instrumentation means in a circular buffer or other type memory management arrangement for processing by the computer means when an event of interest (such as the passing of a ball through the LBA) has taken place. The computing means evaluates and filters the signals for noise and determines the appropriate signal for processing. The computing means then calculates the necessary information as explained below. The distances between all light beams and the sphere diameter are input into the computer prior to calculating.

FIG. 1 shows the convention used for the Cartesian coordinate system used by the Apparatus. Axis Z is perpendicular to the LBA with the positive direction away from the projectile launch point. The XY plane lies on the plane of the LBA light beams in the embodiment of FIG. 1. The X axis is horizontal and the Y axis is vertical. The coordinate system used for calculations is arbitrary as long as it is accommodated in all calculations.

Figure 3:
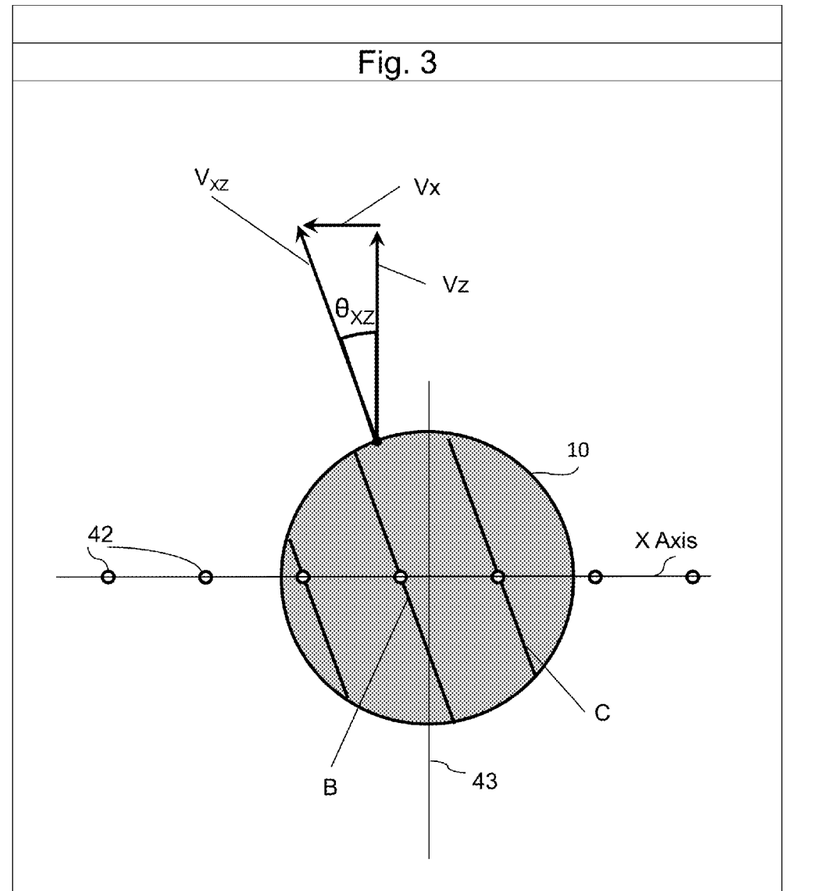
FIG. 3 is a diagram of a sphere showing light beam segments as the sphere passes through the Light Beam Array (LBA).
Figure 4:
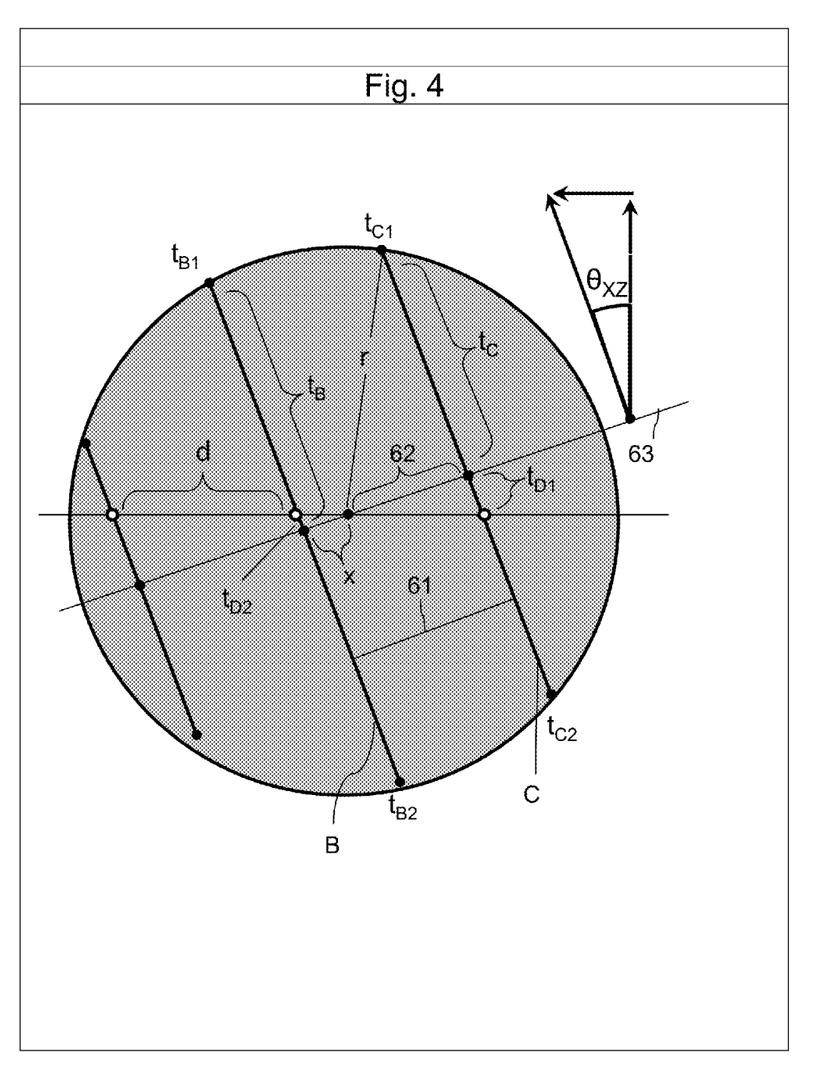
FIG. 4 shows the geometric elements received by the receiving means, recorded by the instrumentation means and used by the calculating means to determine position and velocity vector.
Figure 5:
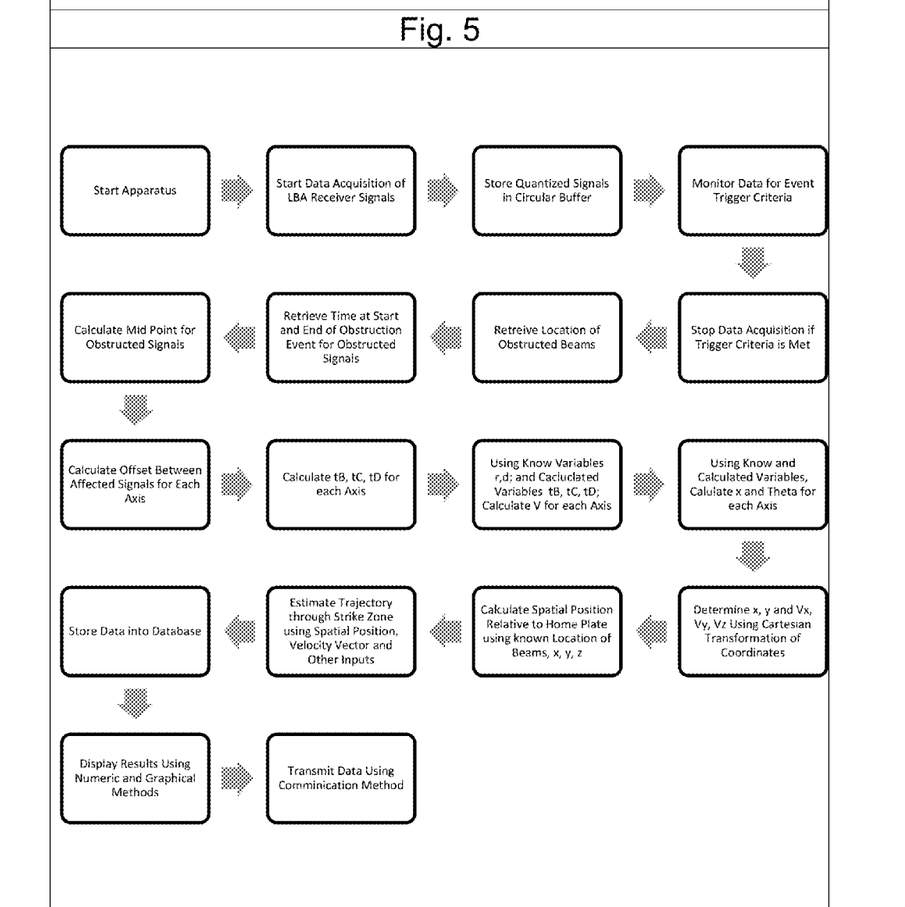
FIG. 5 is a flow diagram of a particular embodiment of the apparatus used to calculate spatial position and velocity vector.

FIG. 3 shows a sphere 10 as it passes through a series of light beams, on a vector $V_{xz}$ non-perpendicular to the plane of the light beams. The vector $V_{xz}$ is composed of components $V_x$ and $V_z$. The light beams 42 shown are parallel to the Y axis, perpendicular to the X axis and perpendicular to the Z axis (43 represents a line parallel to the Z axis). The light beams are obscured by the ball for a period of time which is equal to the chord length of the sphere 10 intersected by the light beam, divided by its velocity $V_{xz}$. The light beams create imaginary line segments across the ball (line segments B and C). A line drawn through the center point of each line segment 63 (FIG. 4) is perpendicular to the direction of flight in the XZ Plane. FIG. 5 shows the relevant geometry needed to solve the problem.

There are three unknowns needed to determine the velocity vector and position of the sphere (see FIG. 5).

$V_{xz}$≡Velocity of the Sphere in the XZ Plane $\theta_{xz}$≡Angle of Sphere Velocity in the XZ Plane with respect to the Z Axis x≡Distance from Center of Sphere to First Obstructed Beam on the Left Side

DEFINITIONS d≡Distance Between Light Beams (know parameter of the Apparatus)

r≡Radius of Sphere (know parameter of the Sphere)

$V_{xz}$≡Velocity of the Sphere in the XZ Plane (calculated by Apparatus)

$V_x$≡X component of velocity in the XZ Plane (calculated by Apparatus)

$V_z$≡Z component of velocity in the XZ Plane (calculated by Apparatus)

$\theta_{xz}$≡Angle of Sphere Velocity in the XZ Plane with respect to the Z axis (calculated by Apparatus)

The apparatus measures the following times relative to each other:

$t_{B1}$: Initial Time of Beam Obstruction along line B
$t_{B2}$: Final Time of Beam Obstruction along line B
$t_{C1}$: Initial Time of Beam Obstruction along line C
$t_{C2}$: Final Time of Beam Obstruction along line C The Apparatus calculates the following times using Line Segment B initial, $t_{B1}$, and final, $t_{B2}$, obscuration of the ball and Line Segment C initial, $t_{C1}$, and final, $t_{C2}$, obscuration of the ball. $t_B$ and $t_C$ are time intervals which are half of the total length (time) of their respective line segments:

$$t_B = (t_{B2} - t_{B1})/2$$

$$t_C = (t_{C2} - t_{C1})/2$$

$t_D$ is the time difference between the midpoint of B and the midpoint of C. The line that runs through the midpoint of Line Segments B and C is perpendicular to the direction of flight in the XZ plane.

$t_D$ is shown on FIG. 5 as the sum of $t_{D1}$ and $t_{D2}$, although this depiction is for reference only and not required for calculation. $t_D$ is calculated as follows.

$$t_D = (t_{B1} + t_B) - (t_{C1} + t_c)$$

The sign of to determines the direction of the velocity vector in the X direction of the XZ plane. A sign that is "+" is moving left, "−" is toward the right. A value of 0 for to indicates the absence of a lateral vector component.

There are 3 independent equations needed to solve for the 3 unknowns. The 3 simultaneous equations are built around 1) Line Segment B, 2) Line Segment C and 3) the midpoint offset between Line Segment B and Line Segment C.

The first equation is written around Line Segment B:

$$r^2 = x^2 + V^2 t_b^2 \quad \text{(Equation 1)}$$

The second equation is written around the Line Segment C where $(d \cos \theta xz - x)$ is show as reference 62:

$$r^2 = (d \cos \theta xz - x)^2 + V_{xz}^2 t_c^2 \quad \text{(Equation 2)}$$

The third equation is written around the midpoint offset of Segments B and C where $d \cos \theta xz$ is shown as reference 61.

$$(d \cos \theta xz)^2 = d^2 - V_{xz}^2 t_d^2 \quad \text{(Equation 3)}$$

There are now 3 equations (Equations 1, 2, 3) with 3 unknowns ($V_{xz}$, x, $\cos \theta xz$)

The resultant solution for the 3 unknowns is as follows:

$$V_{xz} = \{(-2d^2(t_b^2 + t_c^2 - t_d^2) + (4r^2 t_d^2) + \{[2d^2(t_b^2 + t_c^2 - t_d^2) + (4r^2 t_d^2)]^2 - [4((t_b^4 + t_c^4 + t_d^4) - 2(t_b^2 t_c^2 + t_b^2 t_d^2 + t_c^2 t_d^2))(d^4 - 4r^2 d^2)]\}^{0.5})/2[(t_b^4 + t_c^4 + t_d^4) - 2(t_b^2 t_c^2 - t_b^2 t_d^2 - t_c^2 t_d^2)]\}^{0.5}$$

$$\theta_{xz} = \text{inv} \cos((d^2 - V_{xz}^2 t_d^2)d_2)^{0.5}$$

$$x = (r^2 - V_{xz}^2 t_b^2)^{0.5}$$

A similar approach can be used to solve for the unknowns of the second LBA. In one case the information obtained is the velocity vector and position of the sphere in the XZ plane. In the orthogonal direction the velocity vector and position are obtained for the YZ plane.

$V_{YZ}$=Velocity of the Sphere in the YZ Plane
$\theta_{YZ}$=Angle of Sphere Velocity in the YZ Plane with respect to the Z Axis
y=Distance from Center of Sphere to top Obstructed Beam The solution equations are identical with $V_{YZ}$, $\theta_{YZ}$, y replacing $V_{xz}$, $\theta_{xz}$, x respectively and using new time constants obtained from the second LBA obscured beams receiving and instrumentation means.

By combining both the XZ and YZ velocity vectors, the complete 3 dimensional velocity vector is obtained. Since x and y are known and the location of each obscured beam is known, the X and Y position on the reference coordinate system can be obtained. The Z axis velocity vector component is obtained from the calculation from each plane. This redundant information can be used to improve the accuracy of the calculation.

Additionally, when 3 beams lie within a diameter of the sphere (as is the case if the beams are placed closer together), then additional redundant information is obtained which can be used to further improve the accuracy of the calculations.

Additionally, the calculations do not require orthogonal LBAs. In the case of non-orthogonal LBAs, a simple transformation into the desired frame of reference is performed.

Additionally, the above discussion applies to any spherical object, such as used in golf, tennis, soccer or numerous other applications, as long as the spacing between beams allows for at least 2 obscured beams for each particular LBA.

Additionally, any number of LBAs can be used in any number of directions. There are advantages to using many LBAs, such as improved accuracy as well as disadvantages, including cost.

Additionally, all LBAs can lie on the same plane or each LBA can be on a separate plane or any combination thereof.

In a preferred embodiment, two Light Beam Arrays (LBAs), which both lie on a common plane, are used. This is shown in FIG. 1.

Figure 6:
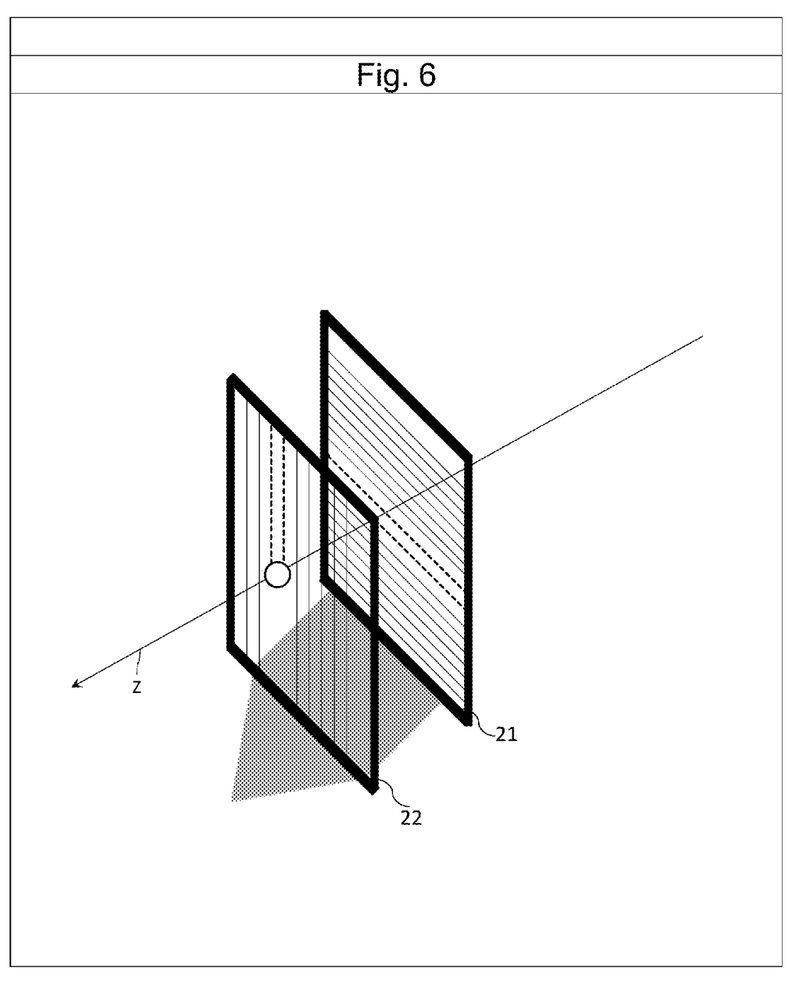
FIG. 6 is a schematic diagram of a projecting and receiving means of the invention for a particular embodiment of the apparatus.

In another particular embodiment, FIG. 6, each LBA lies on a distinct plane. The first LBA 21 contains the all the beam transmitters and receivers in one direction. The second LBA 22 contains all beam transmitters and receivers in the second direction. An advantage to this embodiment is that that an additional velocity computation can be made in the Z direction that can be used to improve accuracy in the Z direction. An advantage or disadvantage of this embodiment is that the distance between the LBAs requires an extrapolation for use in calculating the 3 dimensional position of the sphere. Likewise, the total velocity vector is obtained from 2 unique locations, which could be an advantage or a disadvantage.

Figure 7:
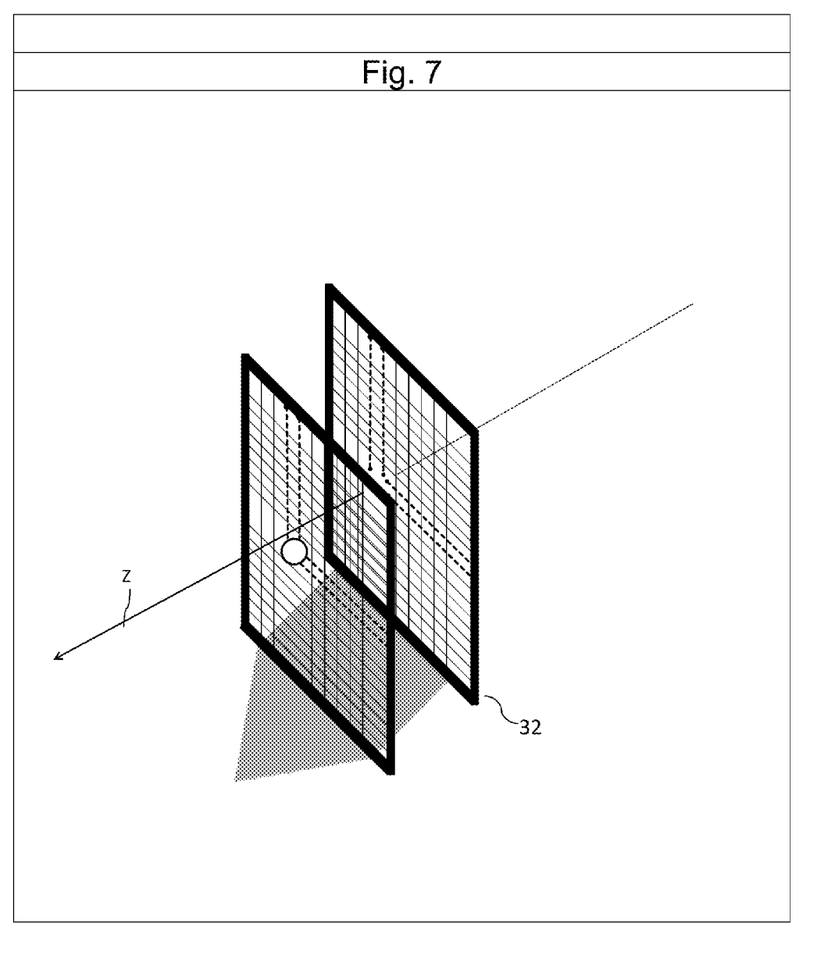
FIG. 7 is a schematic diagram of a projecting and receiving means of the invention for a particular embodiment of the apparatus.

In a third particular embodiment, FIG. 7, the LBAs are configured similar to that of the FIG. 1 embodiment; however, 2 LBA sets 32 are utilized, each set containing 2 LBAs. An advantage to this embodiment is that more accuracy can be determined about the trajectory of the ball. The previous embodiments are able to accurately measure spatial position and velocity, but are not able to measure acceleration. The use of 2 LBA sets allows for calculating the change in velocity with respect to time ($\Delta V/\Delta t$) for a determination of 3 dimensional acceleration as well as velocity and spatial position. It also allows for an additional calculation of velocity based on the distance between LBA sets and the time to traverse said distance. It also allow for a more accurate determination of trajectory because the position and velocity are known at 2 different locations. Additionally, a second LBA set placed on an important plane, such as both the front plane of the Strike Zone and the back of the rectangular portion of the Strike Zone tetrahedron provide important information about the precise ball flight characteristics at key points in the trajectory. Of course a disadvantage to this embodiment could be cost.

Various modes of carrying out the invention are contemplated as being within the scope of the following claims particularly pointing out and distinctly claiming the subject matter that is regarded as the invention.

I claim:

1. An apparatus for determining the spatial position, velocity, and trajectory of a spherical object comprising:
   a projecting means for projecting a first plurality of parallel beams of light within a first plane with a separation distances, between adjacent beams less than the radius of the spherical object;
   a detecting means for detecting the blockage of each beam of light from the projecting means by the spherical object;
   an instrumentation means for measuring a time of each beam blockage relative to each beam that is blocked by the spherical object; and
   a computing means for computing the position, velocity, and trajectory of the spherical object based on the times, the beam separation distance, and the diameter of the spherical object.

2. The apparatus of claim 1, wherein the projecting means further comprising a second plurality of parallel beams of light within a second plane with a separation distances between adjacent beams less than the radius of the spherical object with the second plane coplanar to the first plane and the beams of the second plane non-parallel to the beams of the first plane.

3. The apparatus of claim 2, wherein the distance between the first plane and the second plane is zero and the light beams of the first plane and the light beams of the second plane are at orthogonal angle to each other.

4. A method for determining the velocity, trajectory and position of a spherical object, comprising the steps of:
- passing the spherical object through two parallel rays of light thereby blocking the rays to thereby measure a time at which each ray is blocked relative to each blocked ray of light; and
- computing the velocity, trajectory, and position of the spherical object based on the times, a diameter of the spherical object, and a distance between the parallel rays of light.

* * * * *